R. M. PIERSON.
VALVE STRUCTURE.
APPLICATION FILED OCT. 29, 1919.

1,399,791. Patented Dec. 13, 1921.

Inventor.
Robert M. Pierson.

UNITED STATES PATENT OFFICE.

ROBERT M. PIERSON, OF AKRON, OHIO, ASSIGNOR TO THE B. F. GOODRICH COMPANY, OF NEW YORK, N. Y., A CORPORATION OF NEW YORK.

VALVE STRUCTURE.

1,399,791.  Specification of Letters Patent.  Patented Dec. 13, 1921.

Application filed October 29, 1919. Serial No. 334,332.

*To all whom it may concern:*

Be it known that I, ROBERT M. PIERSON, a citizen of the United States, residing at Akron, in the county of Summit and State of Ohio, have invented a certain new and useful Valve Structure, of which the following is a specification.

This invention relates to means for mounting and controlling valves, more particularly large valves of the disk type adapted for use on balloons, and its object is to provide means of greater simplicity and compactness than the devices heretofore in use for guiding and supporting the valve proper and yieldingly closing the same against its seat.

Figure 1:
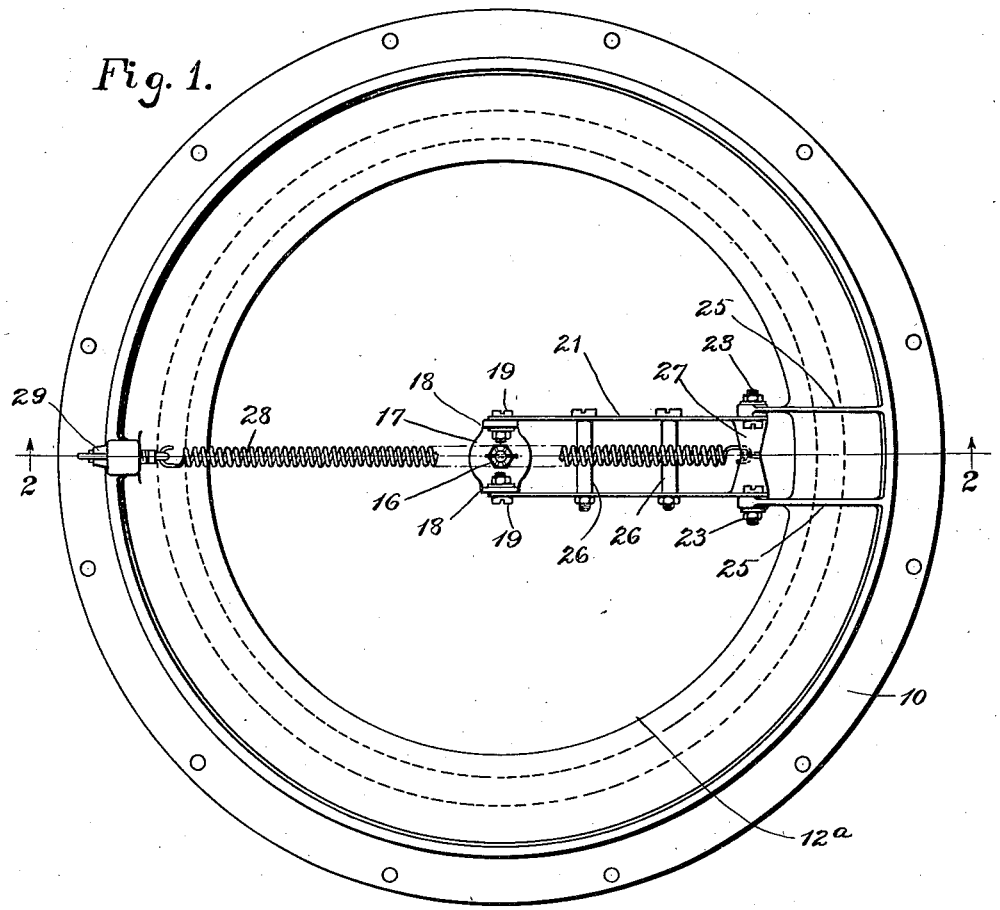

Of the accompanying drawings, Figure 1 is a plan view, looking from the outlet side, of a valve structure embodying my invention.

Figure 2:
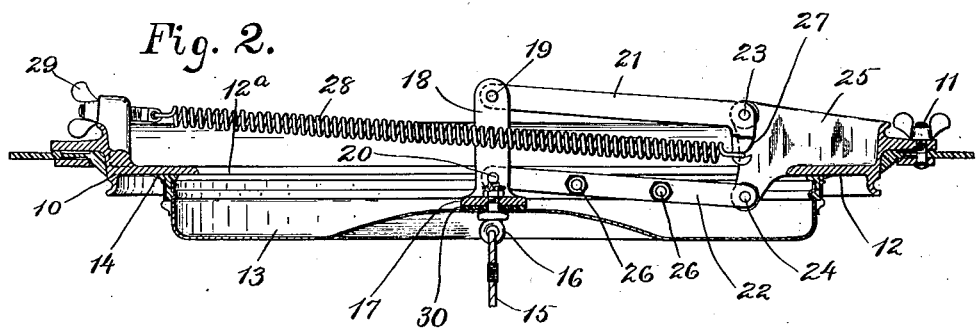

Fig. 2 is a diametric section on the line 2—2 of Fig. 1.

The drawings show, for illustrative purposes, a preferred embodiment of the invention used in connection with an inwardly-opening gas-release valve for balloons of the kite and dirigible types. It will be understood that various uses of the invention are possible and that various changes may be made in the particular form of embodiment.

10 is a metallic frame adapted to be attached to the margins of an opening in the balloon envelop by means of bolts 11 and provided with an annular seat 12, (preferably flat, as shown) surrounding a valve-port 12$^a$, with which seat the shallow cup-shaped disk valve 13 coacts, there being on the edge of said valve a flexible-lipped soft-rubber packing ring or gasket 14 which permits a certain amount of axial movement of the valve relative to the seat without breaking the sealing contact between the two. 15 is a cord attached to an eye-bolt 16 in the center of the valve and adapted to be actuated by automatic or manual means, or both, for the purpose of opening the valve to permit the escape of gas, this cord in a balloon of either of the types named being usually connected with the air ballonnet so as automatically to pull the valve open when the gas pressure exceeds a certain amount relative to the pressure of the atmosphere.

In these balloon valves, and sometimes in valves for other uses, it is desirable to provide a form of valve supporting and guiding means which shall be simple and compact and as nearly as posible confined in it location to the port or opening controlled by the valve and defined in general by the annular frame structure which includes the valve seat. It is further desirable in many cases that the force of the spring provided for yieldingly holding the valve against its seat shall be so applied and the spring-means so disposed with reference to the other parts that a relatively-small increment of force is developed in the spring at full opening of the valve, as compared with its force when the valve is seated, for in that case the valve when automatically opened by the gas pressure reaching a predetermined amount will tend to a full and wide opening affording a large port area for the quick escape of the gas. These objects are accomplished in the structure here represented. Centrally mounted on the outer face of the valve 13 and conveniently secured thereto by means of the bolt 16 is a stem structure including a plate 17 formed with a pair of upright flat posts or arms 18 to which are pivoted at 19, 20 the inner ends of a pair of guide-links or arms 21, 22 positioned one beyond the other longitudinally, or in the direction of valve movement, the outer ends of these links being pivoted at 23, 24 to a pair of ears or webs 25 which form part of the frame casting 10. The construction of each link includes a pair of flat side bars or plates which, in the lower link 22, are preferably, as shown, connected by cross bars 26 in order to stiffen this link, said bars being omitted in the upper link 21 in order that the latter may straddle the spring and not interfere therewith when the valve is pulled open.

The upper link 21 is provided with a short hooked arm 27 projecting downwardly from the region of the fulcrum pivots 23, and said link with its arm 27 therefor constitutes a ball-crank lever. 28 is a helical pull-spring attached at one end to the hooked arm 27 and at its other end to a point on the frame 10 on the opposite side thereof from the pivots 23, 24, at which point I prefer to locate an adjusting device such as the thumb-nut bolt 29 for varying the tension of said spring at will, this adjusting means being accessible from the outside of the balloon.

The valve 13 may be made to a limited extent self-adjusting with reference to its seat in order to allow for any slight misalinement of said valve, by attaching the valve disk to its stem member 17, 18 by something in the nature of a universal pivotal connection. Such connection may, for example, consist merely of the bolt 16 and plate 17, together with a soft-rubber washer 30 located between said plate and the valve disk, the washer yielding when necessary to permit the movement of the valve, and serving incidentally to seal the hole in the valve disk through which the bolt 16 passes.

The relative positions of the links 21, 22 and their pivots with reference to the fixed frame 10 and the valve stem 17, 18 are such that during the opening and closing movements of the valve, the latter will be guided in an arcuate path in successive positions of substantial parallelism to itself and to the plane of the valve-seat 12 and port 12ª. They are also such that each link coöperates with the other in controlling the tilting movement of the valve with reference to its seat, such control in this instance amounting to a substantial prevention of tilting, although I do not wholly limit myself to a valve which remains parallel with its seat in all open positions. The spring 28, located crosswise of said port, may be made of considerable relative length without extending beyond the dimensions of the frame 10 in either an axial or a transverse direction. This valve-guiding and spring structure is obviously very simple and compact, especially as compared with prior balloon valves employing a circumferential series of lever, link and spring units. The increment of spring pressure from closed to full-open position of the valve is relatively small and the degree of valve opening is correspondingly large as compared with the magnitude of the valve-opening force. The type and number of springs employed and the point of application thereof may, of course, be somewhat varied without departing from my invention, but I consider it an advantage to use a long, transverse, helical pull-spring substantially as shown, having a fixed anchorage at one end and applied at it other end to a valve-guiding lever which is pivoted on the frame rather than on the valve itself, since in that case the lever end of the spring partakes only of the pivotal movement of the lever and not also of the movement of the valve. This feature of my invention is not limited to use with a valve having an arcuate movement.

I claim:

1. In combination, a valve-seat surrounding a port, a valve, and means for guiding said valve in an arcuate path toward and from its seat in successive positions of substantial parallelism to itself and to the plane of said seat.

2. In combination, a valve-seat surrounding a port, a valve, and a pair of links arranged for guiding said valve in an arcuate path with a parallel movement.

3. In combination, a frame having a valve seat surrounding a port, a valve, a link pivoted to the frame and to the valve for guiding said valve in an arcuate path toward and from its seat, and coöperating means for controlling the tilting of the valve with reference to its seat.

4. In combination, a frame having a valve-seat surrounding a port, a valve, a lever fulcrumed on the frame at one side of said port and having an arm whose inner end connects with the valve in the central region of the latter for guiding said valve in an arcuate path toward and from its seat, coöperating means for controlling the tilting of the valve, and a spring connected with a point on said lever whose range of movement is small compared with that of the valve.

5. In combination, a frame having a valve-seat surrounding a port, a valve movable toward and from said seat, a valve-guiding lever connected to said valve substantially in the middle thereof and pivoted to the frame at one side of said port, and a helical pull-spring attached at one end to said lever and at its other end to the frame on the opposite side of said port.

6. In combination, a frame having a valve-seat surrounding a port, a pair of valve-guiding links pivotally connected at one end to the frame at one side of said port and at the other end to said valve for imposing a parallel arcuate movement upon the valve, and a transverse pull-spring spanning the valve port and connected at one end to one of said links and at its other end to the valve frame.

7. In combination, a frame having a valve-seat surrounding a port, a disk valve movable toward and from said seat and having a stem structure substantially central thereof, a pair of links pivoted to said frame on one side of the port at points longitudinally spaced apart and at their other ends pivoted at similarly-spaced points on the stem structure, the one of said links more remote from the valve having an arm projecting toward the other link, and a helical pull-spring attached at one end to said arm and at its other end to a point on the frame upon the opposite side of said port from the point of support of said links.

In witness whereof I have hereunto set my hand this 23d day of October, 1919.

ROBERT M. PIERSON.